(12) United States Patent
Gu

(10) Patent No.: US 10,623,545 B2
(45) Date of Patent: Apr. 14, 2020

(54) RECEIVER MODULE

(71) Applicant: AAC Technologies Pte. Ltd., Singapore (SG)

(72) Inventor: Xiaojiang Gu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/530,988

(22) Filed: Aug. 2, 2019

(65) Prior Publication Data
US 2020/0053193 A1    Feb. 13, 2020

(30) Foreign Application Priority Data

Aug. 10, 2018   (CN) .................... 2018 2 1303527 U

(51) Int. Cl.
| | |
|---|---|
| *H04M 1/20* | (2006.01) |
| *H04M 1/60* | (2006.01) |
| *H04R 1/28* | (2006.01) |
| *H04R 1/04* | (2006.01) |
| *H04R 9/06* | (2006.01) |
| *H04R 9/02* | (2006.01) |

(52) U.S. Cl.
CPC ........... *H04M 1/20* (2013.01); *H04M 1/6033* (2013.01); *H04R 1/04* (2013.01); *H04R 1/2888* (2013.01); *H04R 9/025* (2013.01); *H04R 9/06* (2013.01); *H04R 2400/11* (2013.01); *H04R 2410/05* (2013.01)

(58) Field of Classification Search
CPC ...... H04R 1/1083; H04M 9/082; H04M 9/08; H04B 3/23
USPC .................... 455/550.1, 570, 575.1
See application file for complete search history.

(56) References Cited

U.S. PATENT DOCUMENTS

2011/0256857 A1* 10/2011 Chen ................ H04B 1/525
                                                                455/422.1

* cited by examiner

*Primary Examiner* — Sam Bhattacharya
(74) *Attorney, Agent, or Firm* — W&G Law Group LLP

(57) ABSTRACT

The present disclosure provides a receiver module comprising a receiver, the receiver comprising a basin frame, a vibration system and a front cover, the receiver module further comprises: a fixing member disposed on the front cover, a noise canceling member fixed to a side of the fixing member adjacent to the front cover, and a microphone disposed on a side surface of the noise canceling member away from the vibration system; the fixing member comprises a body portion fixed on the front cover, an extending portion extending from the body portion in a direction away from the front cover, and a through hole penetrating through both the body portion and the extending portion; the noise canceling member is located outside the basin frame and fixed to the extending portion, and it comprises a main body portion and a sound absorption hole penetrating through the main body portion.

6 Claims, 5 Drawing Sheets

RECEIVER MODULE

TECHNICAL FIELD

The present disclosure relates to the field of electro-acoustic conversion, in particular to a receiver module applied to a portable electronic product.

BACKGROUND

As the mobile internet times are coming, the number of smart mobile devices continues to rise. Among many mobile devices, mobile phones are undoubtedly the most common and most portable mobile terminal devices. At present, the functions of mobile phones are extremely diverse, one of which is to provide high-quality music. Therefore, a receiver module for playing sounds are largely applied to current smart mobile devices.

The receiver module according to the related art includes a basin frame, a vibration system fixed within the basin frame, and a front cover disposed on the basin frame for covering the basin frame and enclosing the front cavity with the vibration system, the front cover includes a body portion disposed on the basin frame for covering the basin frame and a sound output hole penetrating through the body portion and in communication with the front cavity.

However, in the receiver module according to the related art, the receiver module does not have a noise canceling function. For example, when the mobile phone is used as a receiver or an earpiece, the communication quality may be affected by noise.

Therefore, it is necessary to provide a new receiver module to solve the above technical problem.

BRIEF DESCRIPTION OF THE DRAWINGS

In order to more clearly describe the technical solutions in the embodiments of the present invention, the drawings used in the description of the embodiments will be briefly described below. It is obvious that the drawings in the following description only relate to some embodiments of the present invention. For those skilled in the art, other drawings may also be obtained according to the accompanying drawings without any creative work, wherein.

DETAILED DESCRIPTION

Figure 1:
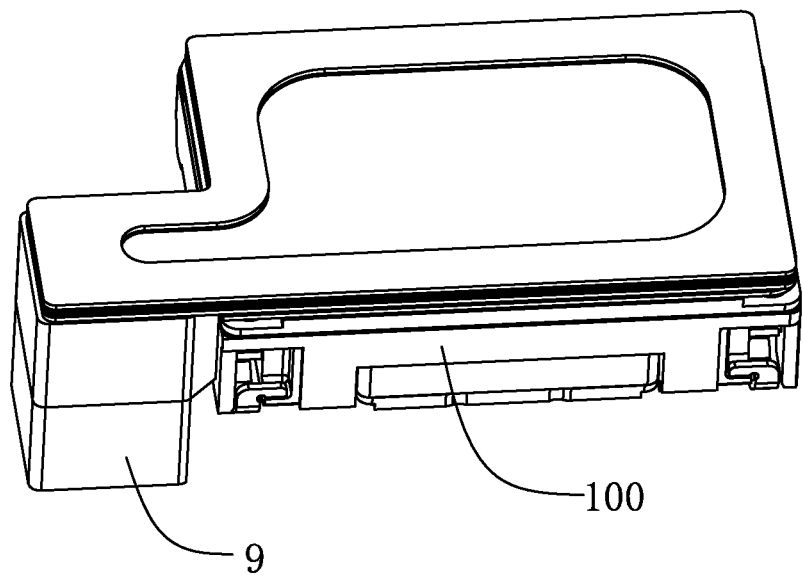
FIG. 1 is a schematic view illustrating a stereo structure of a receiver module in the present disclosure.
Figure 2:
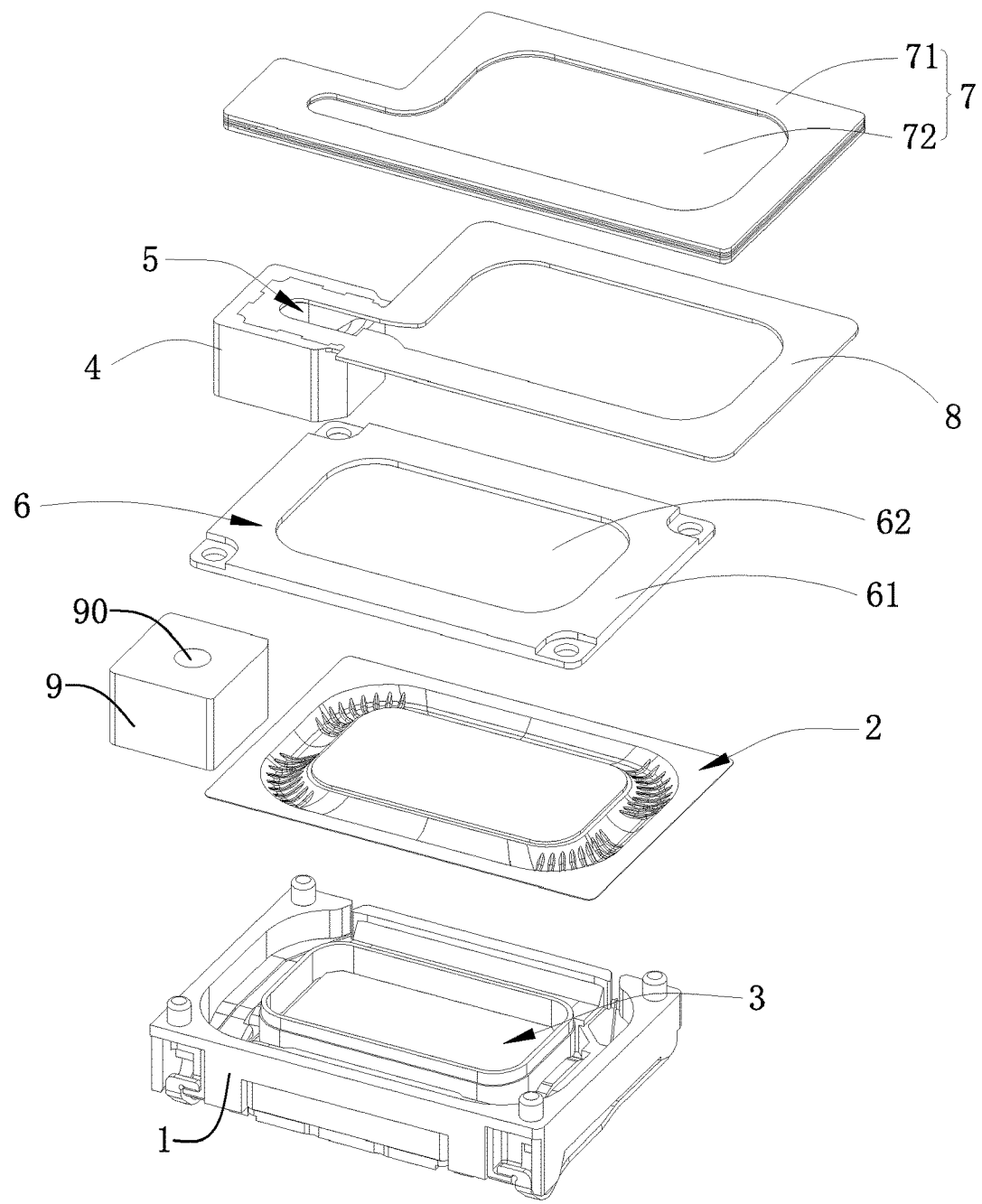
FIG. 2 is an exploded view for the receiver module in the present disclosure.
Figure 3:
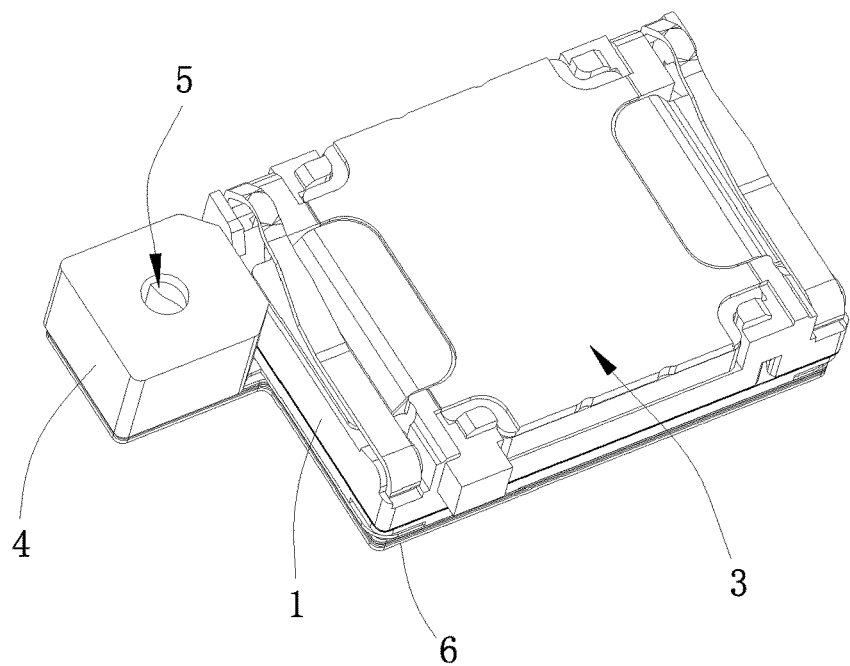
FIG. 3 is a schematic view illustrating a stereo structure of a receiver in the present disclosure.
Figure 4:
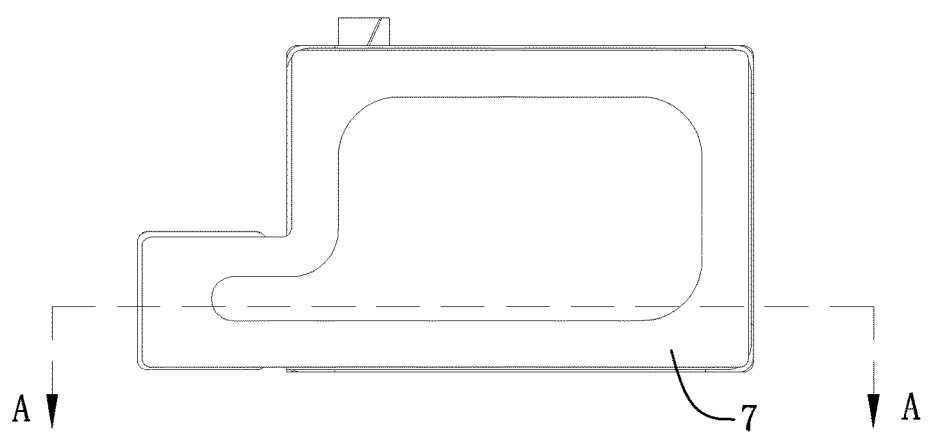
FIG. 4 is a front view of the receiver in the present disclosure.
Figure 5:
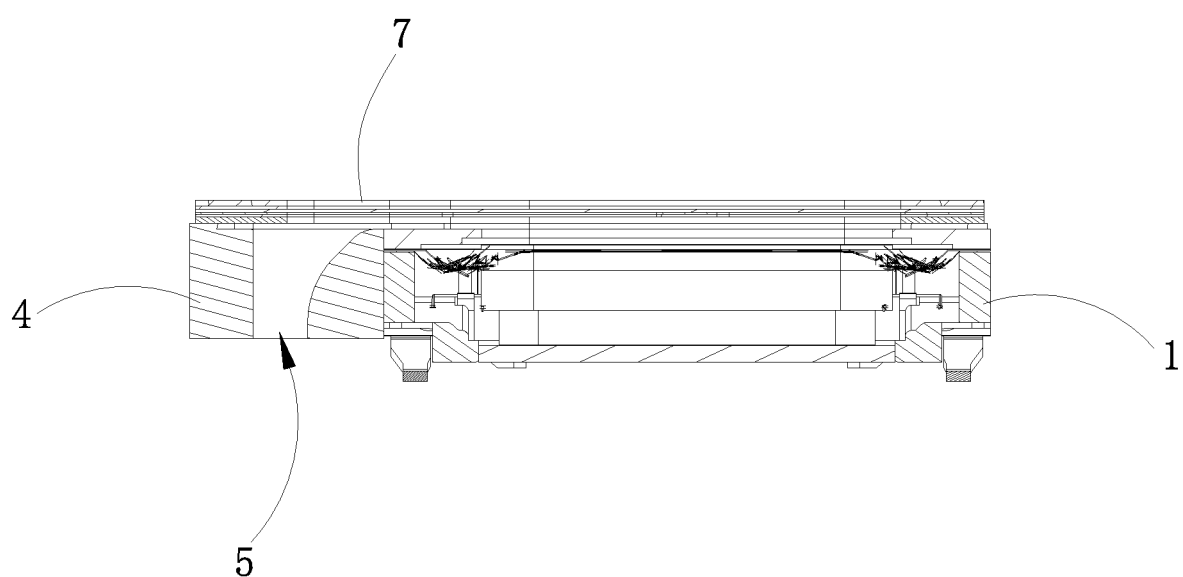
FIG. 5 is a cross-sectional view taken along line A-A of FIG. 3.

The technical solutions in the embodiments of the present invention will be clearly and completely described in conjunction with the drawings in the embodiments of the present invention. It is obvious that the described embodiments are only a part of the embodiments of the present invention, but not all of embodiments. All other embodiments obtained by those skilled in the art based on the embodiments of the present invention without creative work are within the scope of the present invention.

Referring to FIGS. 1-5, the present invention provides a receiver module 200, the receiver module 200 includes a receiver 100 and a microphone 9. The receiver 100 includes a basin frame 1, a vibration system 2, a magnetic circuit system 3, a noise canceling member 4, a sound absorption hole 5, a front cover 6, and a fixing member 8; the microphone 9 is provided with a sound input hole 90.

In the present embodiment, the basin frame 1 is described by taking a basin frame having a rectangular shape as an example. Of course, the basin frame 1 may have a circular shape or other shapes, which is not limited thereto.

The vibration system 2 and the magnetic circuit system 3 are respectively fixed to the basin frame 1, and the magnetic circuit system 3 is configured to drive the vibration system 2 to generate sound by vibration. The basin frame 1, the vibration system 2 and the magnetic circuit system 3 collectively form a rear cavity (not shown) for improving the low frequency acoustic performance of the receiver 100.

Figure 6:
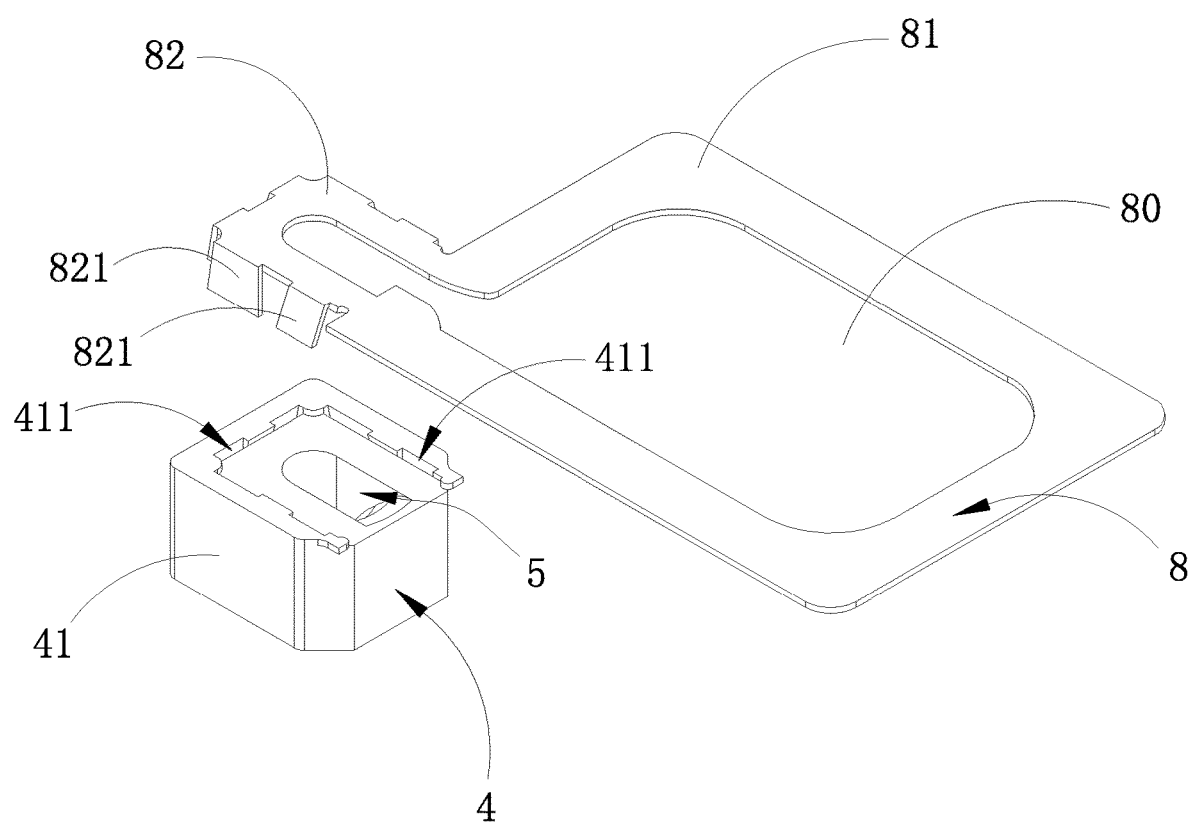
FIG. 6 is a schematic view illustrating part of the structure of the receiver in the present disclosure.

Referring to FIG. 6 as well, the noise canceling member 4 is located outside the basin frame 1, such as, the noise canceling member 4 is located outside the short axis side of the basin frame 1. The noise canceling member 4 includes a main body portion 41 and a sound absorption hole 5, and the main body portion 41 is recessed with a plurality of embedded grooves 411 spaced apart. In the embodiment, the noise canceling member is a plastic block, for example, and the shape thereof is fitted with that of the basin frame, thus, it may reduce the product weight and reduce the material cost while ensuring product performance.

The sound absorption hole 5 penetrates through the main body portion 41 of the noise canceling member 4. The microphone is disposed on a side surface of the noise canceling member 4 away from the fixing member 4. The sound absorption hole 5 serves as a sound input passage for the microphone.

The front cover 6 is disposed on the basin frame 1 by covering the basin frame 1, and the front cover 6 and the vibration system 2 collectively form a front cavity (not shown).

Specifically, the front cover 6 includes a body portion 61 disposed on the basin frame 1 by covering the basin frame 1 and a sound output hole 62 penetrating through the body portion 61. The sound output hole 62 is in communication with the front cavity for generating sounds.

The fixing member 8 is fixed on the front cover 6 by covering the front cover 6. The fixing member 8 includes a body portion 81, an extending portion 82 extending from the body portion 81 in a direction away from the front cover, and a through hole 80 penetrating through both the body portion 81 and the extending portion 82. The body portion 81 is fixed on the front cover 6 by covering the front cover 6, the noise canceling member 4 is fixed to a side of the extending portion 82 adjacent to the front cover 6, and the through hole 80 is in communication with both the sound absorption hole 5 and the sound output hole 62, so that the sound absorption hole 5 is in communication with the sound output hole 62. Thereby, the front cavity, the through hole 80, the sound absorption hole 5, and the sound input hole 90 of the microphone 9 are sequentially in communication, and the sound wave of the front cavity is directed out of the noise canceling member through the through hole 80 and the sound absorption hole 5, and the noise is absorbed and canceled by the microphone.

Specifically, the extending portion 82 is extended with several clasping pieces 821 spaced apart in a direction approaching the front cover 6, and the clasping pieces 821 are respectively clasped and fixed within the embedded grooves 411. Thereby, the noise canceling member could be fixed to a side of the basin frame more securely. In the present embodiment, the fixing member is a stainless steel piece, for example, thereby providing a better holding force to the noise eliminating member.

In one example, the cross-sectional area of an end of the sound absorption hole 5 adjacent to the fixing member 8 is larger than that of an end of the sound absorption hole 5 away from the fixing member 8. The structure has a larger area for absorbing noises and thus has a better effect. Of course, the sound absorption hole 5 may also have other structures, such as a circular via.

In the present embodiment, the sound absorption hole 5 extends in a vibration direction of the vibration system 2 from a side of the noise canceling member 4 adjacent to the fixing member 8. The microphone is located at an end of the sound absorption hole 5 away from the fixing member 8. The structure allows the microphone to absorb call noises from the front of the speaker 100, so that the noise canceling effect is better, thereby improving the acoustic performance of the receiver module 200.

When the receiver module 200 is used as a receiver or an earpiece, for example, the call noise may enter into the receiver module 200 through the through hole 80, and the call noise may be transmitted, through the sound absorption hole 5, to the microphone and absorbed by the microphone, thereby the acoustic performance of the receiver module 200 is effectively improved, and the communication quality is thus improved.

In the embodiment, the receiver module 200 further includes a permeable spacer 7 fixed to the front cover 6. The permeable spacer 7 completely covers the sound output hole 62 and the through hole 80, and makes the sound output hole 62 and the through hole 80 be in communication with outside, respectively.

The permeable spacer 7 has a structure that blocks solid materials by flowing gas. Therefore, after the permeable spacer 7 covers the sound output hole 62 and the through hole 80, the sound output hole 62 and the through hole 80 circulates with outside air, and on the other hand, pollution and clogging due to entry of foreign matters are prevented, thereby improving the reliability of the receiver module 200.

Specifically, the permeable spacer 7 includes an annular frame 71 fixed to the fixing member 8 and a permeable membrane 72 adhered to the frame 71. The permeable membrane 72 completely covers the sound output hole 62 and the through hole 80. The frame 71 improves the fixing stability of the permeable spacer 7.

In this embodiment, the permeable spacer 7 is adhered and fixed to a side of the front cover 6 away from the vibration system 2, and this arrangement will not occupy the space of the front cavity 10, so that the vibration system has enough space for vibration.

Compared with the related art, the receiver module of the present invention is provided with a noise canceling member at one side of the basin frame, and the noise canceling member is provided with a sound absorption hole penetrating therethrough; a fixing member is fixed on the front cover by covering the front cover, and the fixing member is provided with a through hole penetrating therethrough, the through hole is in communication with the sound absorption hole; and a microphone is provided on a side surface of the noise canceling member away from the vibration system; the sound wave of the front cavity enters through the though hole, and is transmitted from the sound absorption hole to the microphone, so that the microphone absorbs the call noise, thereby effectively improving the acoustic performance of the receiver module.

Those skilled in the art may understand that the above embodiments are specific embodiments for implementing the present disclosure, and in actual applications, various changes may be made to the form or the details of the technical solutions without departing from the spirit and scope of the present disclosure.

What is claimed is:

1. A receiver module comprising a receiver, wherein, the receiver comprises a basin frame, a vibration system fixed to the basin frame, and a front cover disposed on the basin frame by covering the basin frame, the front cover forms a front cavity with the vibration system, and the front cover comprises a body portion disposed on the basin frame by covering the basin frame, and a sound output hole penetrating through the body portion and in communication with the front cavity, wherein, the receiver module further comprises: a fixing member disposed on the front cover by covering the front cover, a noise canceling member fixed to a side of the fixing member adjacent to the front cover, and a microphone disposed on a side surface of the noise canceling member away from the vibration system;

the fixing member comprises a body portion fixed on the front cover by covering the front cover, an extending portion extending from the body portion in a direction away from the front cover, and a through hole penetrating through both the body portion and the extending portion;

the noise canceling member is located outside the basin frame and fixed to the extending portion, and the noise canceling member comprises a main body portion and a sound absorption hole penetrating through the main body portion;

the main body portion is recessed with several embedded grooves spaced apart, and the extending portion is extended with several clasping pieces spaced apart in a direction approaching the front cover, the clasping pieces are clasped and fixed within the embedded grooves; the front cavity, the through hole, the sound absorption hole and a sound input hole of the microphone are sequentially in communication; and a sound wave of the front cavity is directed out of the noise canceling member through the through hole and the sound absorption hole and the noise is absorbed and canceled by the microphone.

2. The receiver module according to claim 1, wherein, the sound absorption hole extends in a vibration direction of the vibration system from a side of the noise canceling member adjacent to the fixing member, and the microphone is disposed at a side of the noise canceling member away from the fixing member.

3. The receiver module according to claim 2, wherein, the cross-sectional area of an end of the sound absorption hole adjacent to the fixing member is larger than that of an end of the sound absorption hole away from the fixing member.

4. The receiver module according to claim 2, wherein, the sound absorption hole is an via circular.

5. The receiver module according to claim 1, wherein, the receiver module further comprises a permeable spacer fixed to the fixing member, the permeable spacer completely covers the sound output hole and the through hole, and makes the sound output hole and the through hole in communication with outside, respectively.

6. The receiver module according to claim 5, wherein, the permeable spacer comprises an annular frame fixed to the front cover and a permeable membrane adhered to the frame, and the permeable membrane completely covers the sound hole and the through hole.

* * * * *